May 6, 1924.

M. LACHMAN ET AL 1,493,043

PREPARING OF METAL PLATES FOR WELDING

Filed Feb. 18, 1922

INVENTOR
Maurice Lachman, Edward Fulda
and Laurence S. Lachman
BY Townsend + Decker
ATTORNEYS Patented May 6, 1924.

1,493,043

UNITED STATES PATENT OFFICE.

MAURICE LACHMAN, EDWARD FULDA, AND LAURENCE S. LACHMAN, OF NEW YORK, N. Y., ASSIGNORS TO UNIVERSAL ELECTRIC WELDING COMPANY, OF LONG ISLAND CITY, NEW YORK, A CORPORATION OF NEW YORK.

PREPARING OF METAL PLATES FOR WELDING.

Application filed February 18, 1922. Serial No. 537,424.

*To all whom it may concern:*

Be it known that we, MAURICE LACHMAN, EDWARD FULDA, and LAURENCE S. LACHMAN, citizens of the United States, and residents of New York, in the county of New York and State of New York, have invented certain new and useful Improvements in Preparing of Metal Plates for Welding, of which the following is a specification.

Our invention relates to the manufacture of composite metal work wherein two or more plates or sheets of metal are fastened together by electric welding at spots on their opposed surfaces. As the invention is particularly useful in producing a composite metal structure wherein three members are permanently fastened together between two others, as for instance in the production of flanged metal bars, beams, columns or girders in the general manner described in our companion applications Serial Nos. 537,422 and 537,423, filed on even date herewith, so as to avoid the presence of bolts or rivets in flanged metal bars, beams or girders, our invention will be described as applied to that branch of the metal fabricating art.

The present invention relates particularly to the manner of providing a plate or member to be welded, with projections extending from its opposite surfaces in alignment with one another, and especially to so provide the opposite projections by swaging, forging or indenting the plate on one side to raise a projection upon its opposite side.

Briefly stated, our invention consists in swaging, forging or indenting one of the plates to be welded, so that it will present on one face a projection, and providing a projection in line therewith on the opposite face by securing in the cavity formed by the indenting process a suitable plug or button located and fastened therein, and arranged to project above the plane of said surface.

In the construction of metal work such as beams or girders and having three plates superposed upon and welded to one another, we prefer to form the projections upon the intermediate plate.

Our invention further is useful, among other things, in insuring a good weld on the surface having the projection formed by the indenting process, since the metal thus projected from one face of the plate will, in the welding operation, be prevented from readily collapsing completely back into the indentation itself, or to coincidence with the general plane of the surface from which it projects under the welding pressure, and when heated to welding temperature. This insures a good welding pressure and consequently a good joint at the spot coincident with said projected metal. This resistance to the collapse or recession of the projected metal is produced through the presence of the button or piece of metal which is located in the depression or cavity, and by engagement with the welding die resists the tendency of the projection to collapse.

As applied to the construction of beams, girders or similar fabricated steel construction, our invention consists in swaging or indenting a roll, web or flat so that it will present on one face a projection, and on the opposite face a cavity or indentation, and providing a projection on said opposite face in line with the first-named projection by a plug or button, or piece of metal located in and held in said cavity and forming one of the two projections by which two angle bars or plates may be welded respectively to opposite faces of the web or flat.

In the accompanying drawings:

Fig. 1 presents in plan or side elevation a rolled web or flat and shows one of the welding projections which may be employed in any number in making up the structure.

Figure 1:
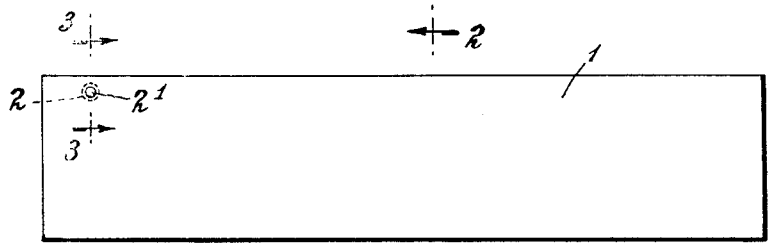
Figure 2:
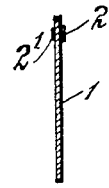
Fig. 2 is a cross-section of Fig. 1 on the line 2—2.
Figure 4:
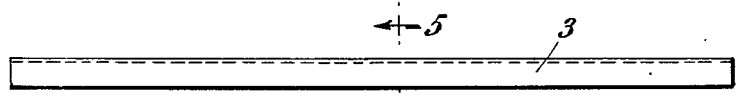
Fig. 4 is a side elevation.
Figure 5:
Fig. 5 is a cross-section at any point in Fig. 4 showing a plain rolled imperforate angle bar used in making up the structure.
Figure 3:
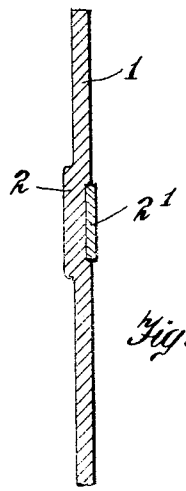
Fig. 3 is an enlarged cross-section through said web or flat in the line of the projection and shows the web furnished with the additional welding button located in a depression in one face thereof opposite the bulge or projection swaged or forged to project from its opposite face.

Referring to Figs. 1, 2 and 3, 2 indicates a welding projection formed in the rolling or by other operation on the web or flat 1. By this forming operation a welding projection extending from one face of the web or flat 1 is provided, the metal, however, of the web being imperforate. In the cavity on the opposite face of the web resulting from the forming operation, a welding button or projection 2' is located so as to project above the plane of said opposite surface. Said button or welding piece 2' may be suitably formed so as to be retained by friction or otherwise in the cavity wherein it is located. The plate is thus provided with projections from its opposite faces in line with one another which are useful in localizing the heat and pressure in the operation of securing said plate to another plate when the weld is formed by securing the parts in position between a pair of welding dies and applying current and pressure.

As will be seen, the application of the separate welding piece in the cavity supplies additional metal in line with the weld and insures a proper amount of material as well as a definite pressure the point of weld and in this respect is superior to the method of merely indenting the metal, in which latter case the softening of the projection allows the projected metal to be pressed back into the indentation, thereby interfering with the application of the full pressure. Furthermore the button supplies a certain amount of extra metal which is useful in producing a good and strong union between the surfaces.

Figure 6:
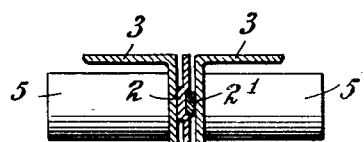
Fig. 6 shows the web or flat assembled between two angle bars to form, by the use of electric welding dies, the flanged bar or beam wherein one arm of both angle bars is integrally fastened to a face of the web and the other arms constitute the flange.
Figure 8:
Fig. 8 shows a cupped welding button adapted for fastening in the indentation or depression in one face of the web.

In the drawing the projection upon one face of the plate formed by indenting or swaging it is shown as greater than the projection formed by the button on the opposite face, but obviously the proportion of the projections to one another may be varied from that shown by varying the relative size of the swaging or indenting tool itself and the size of the depression in the opposite die so that the size of the indentation and consequently of the projecting button will be the same as or less than the size of the projection 2. In order that said button may be effectively retained we prefer to make it from a disc of metal having a slight bulge at its centre and of a circumference which permits it to just fit the depression. When applied in said depression and struck by a hammer or subjected to other action for forcing it down into the depression, it will be caused to expand at its edge against the wall of the depression, thus securely holding it in place. The web thus furnished with welding projections extending from opposite sides thereof and in line with one another is placed in position between the arms of two angle bars 3, as illustrated in Fig. 6, and the pressure of welding and heating dies 5 is applied to the exterior sides or surfaces of said arms so that the welding projections and parts immediately surrounding the same become heated to the welding temperature when squeezed between said dies with the effect, under the applied pressure, of forming a homogeneous integral weld involving the imposed surfaces of the embracing members 3 and the opposite surfaces of the intermediate member 1.

Figure 7:
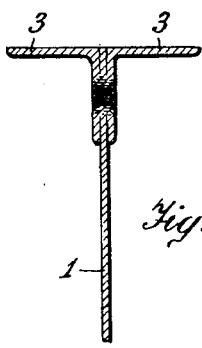
Fig. 7 is a section of the finished work.

In the formation of an I bar or T bar this operation may be repeated at any number of points along the web or flat 1 with the effect in each case of producing a homogenous integral welded union substantially such as illustrated in Fig. 7.

As will be obvious, a structural beam, bar, girder or other structural element produced by this process is free from the objection incident to riveted structures and may also be readily produced without the employment of special rolls for rolling flanges and web integral with one another in a costly special mill while at the same time a durable structure practically as effective for purposes of strength and usual requirements in building construction is attained as in the case of previous methods of construction.

By applying the welding button 2' in the cavity in such way that it will not readily become detached, it is obvious that the parts may be secured together readily when the web or flat 1 is in upright position. For this reason our invention is particularly useful in building construction where the beam, post or girder with its flanges is built up in situ.

What we claim as our invention is:—

1. The herein described method of producing flanged metal bars, beams or girders, consisting in forming a flat or web with a projection from one face thereof to form one welding projection and a cavity in line with said projection on its opposite face, locating a welding piece or button in the cavity to provide two projections in alignment with one another, assembling the web or flat in position between two welding dies with the said projections engaged respectively by the arms of two angle bars and applying pressure and heating current to unite the angle bars to the opposite faces of the web or flat as and for the purpose described.

2. The herein described method of manufacturing composite metal work having two plates welded by their faces to the opposite surface of an intermediate plate, consisting in forming said intermediate plate with a welding projection on one face and a depression in its opposite face in line with said projection and providing a welding button or piece projecting from the opposite face and held in the cavity formed in producing the first-named projection so as to provide a pair of welding projections extending from opposite faces of the intermediate plate and in alignment with one another, assembling the three plates between a pair of welding dies and applying heating current and pressure to weld them together on their opposed surfaces.

3. The herein described method of producing composite metal work comprising two members secured by their faces to the opposite surfaces of an intermediate member, consisting in forming a projection on one face of the intermediate member and a cavity in its opposite face in alignment with said projection and providing a welding projection on the opposite face in alignment with the first by means of a welding piece or button held in the cavity produced in the forming operation, assembling said members between a pair of welding dies and applying current and pressure to weld them together by their opposed surfaces.

4. The method of preparing the metal for the production of composite metal work having two plates spot welded respectively to opposite surfaces of an intermediate plate or member consisting in indenting the intermediate member to provide a welding projection on one face thereof and fastening a welding piece in the indentation and projecting above the indented face, thus providing two welding projections in line with one another for the spot welding operation when the three members are assembled between suitable welding dies.

5. The method of preparing a metal plate with two projections on its opposite faces for use as pressure and heat localizing projections in the operation of spot welding two plates together between a pair of electric welding dies, consisting in indenting said plate to provide a projection upon one face and an indentation upon the other and securing a separate button or a piece of metal in the indentation to provide a projection from the opposite face.

6. The method of preparing metal with projections upon its opposite surfaces for spot welding operations conducted between pressure and current supplying blocks or electrodes, consisting in providing a projection from one surface integral with the plate and a cavity in the opposite surface in alignment therewith and securing a button in said cavity to provide a projection from said opposite surface.

7. The improvement in spot welding a plate of metal to another member, consisting in swaging the plate to produce, by indenting one surface, a projection upon the opposite surface, securing a piece of metal in the indentation formed by the swaging action and applying heating current and pressure while the parts are included between a pair of welding dies.

8. The improvement in electrically spot welding a plate of metal to the surface of another member, consisting in indenting said plate to form a projection from one surface thereof, including the plates between a pair of welding and pressure dies and, during the application of current and pressure, providing a resistance to the collapse of the projected metal by means located in line therewith in the cavity at the back of the indented plate.

Signed at New York, in the county of New York and State of New York, this 15th day of February A. D. 1922.

MAURICE LACHMAN.
LAURENCE S. LACHMAN.
EDWARD FULDA.

Witnesses:
F. B. TOWNSEND,
GEORGE E. BROWN.